US009322317B2

(12) United States Patent
Sasaki et al.

(10) Patent No.: US 9,322,317 B2
(45) Date of Patent: Apr. 26, 2016

(54) EXHAUST DEVICE OF MOTORCYCLE

(71) Applicant: SUZUKI MOTOR CORPORATION, Hamamatsu-shi, Shizuoka (JP)

(72) Inventors: Eiji Sasaki, Hamamatsu (JP); Yoshisato Inayama, Hamamatsu (JP); Kazuhiro Yamamoto, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/539,519

(22) Filed: Nov. 12, 2014

(65) Prior Publication Data

US 2015/0135687 A1 May 21, 2015

(30) Foreign Application Priority Data

Nov. 19, 2013 (JP) ................................. 2013-239032

(51) Int. Cl.
| *F01N 13/08* | (2010.01) |
| *F02B 75/22* | (2006.01) |
| *F01N 13/00* | (2010.01) |
| *F01N 3/28* | (2006.01) |
| *F02B 61/02* | (2006.01) |
| *F01N 13/18* | (2010.01) |
| *F01N 3/10* | (2006.01) |

(52) U.S. Cl.
CPC *F01N 13/08* (2013.01); *F01N 3/28* (2013.01); *F01N 13/002* (2013.01); *F02B 61/02* (2013.01); *F02B 75/22* (2013.01); *F01N 3/10* (2013.01); *F01N 13/1805* (2013.01); *F01N 2340/04* (2013.01); *F01N 2470/00* (2013.01); *F01N 2590/04* (2013.01)

(58) Field of Classification Search
CPC ........... F01N 3/10; F01N 13/00; F01N 13/08; F01N 13/1805; F01N 2340/04; F01N 2470/00; F01N 2590/04
USPC ............................................ 60/299, 323, 324
See application file for complete search history.

(56) References Cited

U.S. PATENT DOCUMENTS

| 2006/0000205 | A1* | 1/2006 | Bozmoski | ........... F01N 13/0097 60/324 |
| 2007/0181360 | A1* | 8/2007 | Nakayama | ................ F01N 1/02 180/309 |
| 2008/0110155 | A1* | 5/2008 | Harada | ...................... F01N 1/08 60/276 |
| 2008/0236152 | A1* | 10/2008 | Morita | ...................... F01N 3/10 60/324 |
| 2010/0192880 | A1* | 8/2010 | Koyanagi | ................ F01N 1/003 123/54.4 |

FOREIGN PATENT DOCUMENTS

| JP | H04-13196 | 3/1992 |
| JP | 2004-026007 | 1/2004 |
| JP | 4108381 | 6/2008 |

* cited by examiner

*Primary Examiner* — Thomas Denion
*Assistant Examiner* — Jorge Leon, Jr.
(74) *Attorney, Agent, or Firm* — Troutman Sanders LLP

(57) ABSTRACT

A motorcycle is equipped with a V-type engine in which front and rear cylinders are arranged in a V-shape along a vehicle front and rear direction. An exhaust device includes: a catalyst device disposed on an exhaust downstream side of a collection part of an exhaust pipe of the front cylinder and an exhaust pipe of the rear cylinder; and a connecting pipe via which the exhaust pipe of the front cylinder and the exhaust pipe of the rear cylinder communicate with each other, and the connecting pipe passes through a space between the exhaust pipe of the rear cylinder and the catalyst device.

6 Claims, 9 Drawing Sheets

EXHAUST DEVICE OF MOTORCYCLE

CROSS-REFERENCE TO RELATED APPLICATIONS

This application is based upon and claims the benefit of priority of the prior Japanese Patent Application No. 2013-239032, filed on Nov. 19, 2013, the entire contents of which are incorporated herein by reference.

BACKGROUND OF THE INVENTION

1. Field of the Invention

The present invention relates to an exhaust device suitable for an engine, especially a V-type engine, in a vehicle such as a motorcycle.

2. Description of the Related Art

From a viewpoint of an environmental problem and the like, a catalyst is loaded in an exhaust device in order to purify exhaust gas of an engine. It is generally known that in order to conform to emission standards (for example, European EUR04 and so on), it is necessary to dispose the catalyst close to an exhaust port to some extent.

Meanwhile, in an ordinary twin engine such as what is called a V-type engine, a method of connecting exhaust pipes of cylinders via a connecting pipe is effective for improvement of torque characteristics, and so on.

Patent Document 1 or Patent Document 2 discloses a concrete example of an exhaust device or the like in an engine of this type.

Patent Document 1: Japanese Examined Patent Application Publication No. 04-13196

Patent Document 2: Japanese Patent No. 4108381

In the conventional exhaust devices, a measure is taken such as disposing the connecting pipe connecting the exhaust pipes on a side of the vehicle (for example, a side of the engine), but this layout is not easy because of space and the like.

Further, in conventional engines including the V-type engine and the like, it has not been necessarily easy to achieve an improvement of the torque characteristics and so on while realizing the exhaust pipe layout necessary for clearing the emission standards. That is, an attempt to satisfy both involves problems such as that middle and low speed range torques are lost or what is called a torque valley occurs.

SUMMARY OF THE INVENTION

In consideration of such circumstances, it is an object of the present invention to provide an exhaust device of a motorcycle that particularly realizes a highly valid and effective exhaust pipe layout.

An exhaust device of a motorcycle according to the present invention is an exhaust device of a motorcycle equipped with a V-type engine in which front and rear cylinders are arranged in a V-shape along a vehicle front and rear direction, the exhaust device including: a catalyst device disposed on an exhaust downstream side of a collection part of an exhaust pipe of the front cylinder and an exhaust pipe of the rear cylinder; and a connecting pipe via which the exhaust pipe of the front cylinder and the exhaust pipe of the rear cylinder communicate with each other, wherein the connecting pipe passes through a space between the exhaust pipe of the rear cylinder and the catalyst device.

Further, in the exhaust device of the motorcycle of the present invention, the exhaust pipe of the rear cylinder has: a front-rear passage part once extending toward a vehicle front side; and a front end bending part bending at a front end portion of the front-rear passage part to communicate with the catalyst device, and the connecting pipe passes through the space between the front-rear passage part and the catalyst device.

Further, in the exhaust device of the motorcycle of the present invention, the exhaust pipe of the rear cylinder has an up-down passage part connecting the front-rear passage part and an exhaust port of the rear cylinder, and the connecting pipe communicates with the up-down passage part and passes through the space surrounded by the front-rear passage part, the catalyst device, and the front end bending part from top to bottom.

Further, in the exhaust device of the motorcycle of the present invention, the front-rear passage part is disposed in an inclined manner so as to be more apart from the catalyst device as the front-rear passage part goes more toward the vehicle front side.

Further, in the exhaust device of the motorcycle of the present invention, the connecting pipe has an underpass part passing under the front end bending part when the connecting pipe passes through the space from top to bottom, to extend forward, and the underpass part is formed flat in terms of an up and down direction.

Further, in the exhaust device of the motorcycle of the present invention, the front cylinder and the rear cylinder are off-set from each other in a vehicle left and right direction, the catalyst device deviates toward the rear cylinder in terms of the vehicle left and right direction, and the front-rear passage part deviates toward the front cylinder in terms of the vehicle left and right direction.

DETAILED DESCRIPTION OF THE PREFERRED EMBODIMENTS

Hereinafter, a suitable embodiment of an exhaust device of a motorcycle in the present invention will be described based on the drawings.

Figure 1:
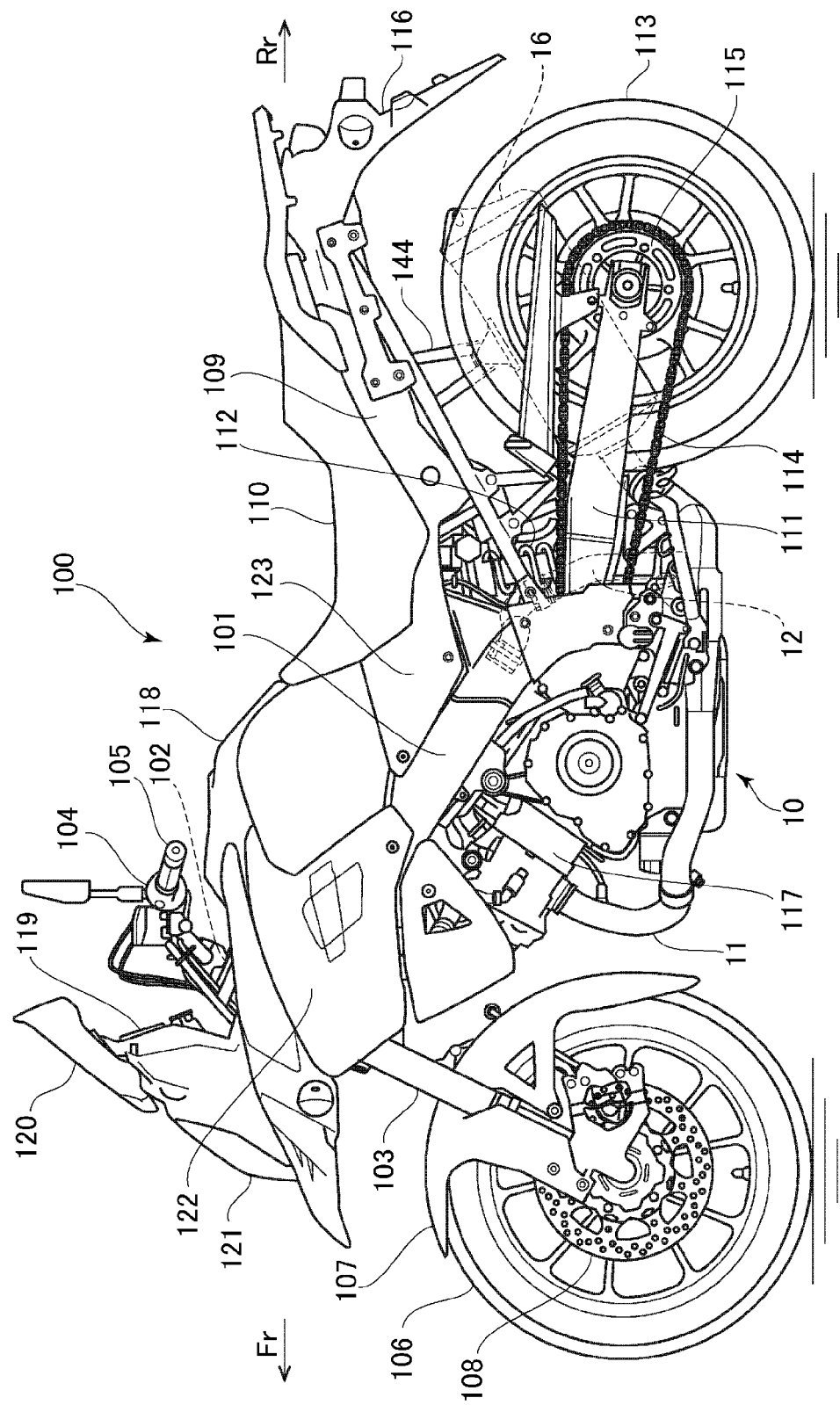
FIG. 1 is a side view illustrating an example of the whole structure of a motorcycle according to an embodiment of the present invention.

First, the whole structure of the motorcycle to which the present invention is applied will be described. In this embodiment, a motorcycle 100 illustrated in FIG. 1 is described as an example. Note that in the drawings used in the description below, a front direction, a rear direction, a right side direction, and a left side direction of the vehicle are indicated by an arrow Fr, an arrow Rr, an arrow R, and an arrow L respectively when necessary.

In FIG. 1, on a front portion of a body frame 101 made of steel or an aluminum alloy material, two left and right front forks 103 which are supported by a steering head pipe 102 so as to be pivotable left and right are provided. On upper ends of the front forks 103, a handlebar 104 is fixed and grips 105 gripped by a passenger or a rider are provided on both ends of the handlebar 104. On lower portions of the front forks 103, a front wheel 106 is rotatably supported and a front fender 107 is fixed so as to cover an upper portion of the front wheel 106. The front wheel 106 has a brake disk 108 which rotates together with the front wheel 106.

The body frame 101 is integrally joined to a rear portion of the steering head pipe 102 and bifurcates rearward into a pair of left and right parts, and the body frame 101 extends from the steering head pipe 102 rear downward while fanning out. In this example, the body frame 101 may be what is called a twin-spar frame. Incidentally, a seat rail 109 extends rearward from the vicinity of a rear portion of the body frame 101 while moderately inclining more upward as it goes more rearward, to support a seat 110 (seating seat). Further, the left and right parts of the body frame 101 join each other while curving or bending downward in the vicinity of their rear end portions, and the body frame 101 as a whole has a three-dimensional structure.

A swing arm 111 is supported on the rear portion of the body frame 101 so as to be swingable in an up and down direction, and a rear shock absorber 112 is mounted between the body frame 101 and the swing arm 111. A rear wheel 113 is rotatably supported on a rear end of the swing arm 111. The rear wheel 113 is driven to rotate via a driven sprocket 115 around which a chain 114 for transmitting motive power of an engine is wound. A rear fender unit 116 is disposed above the rear wheel 113. A plurality of engine mounts are set on the body frame 101, and an engine unit 117 is mounted and supported at a substantially vehicle center portion of the motorcycle 100 by these engine mounts. In this embodiment, the engine unit 117 has, for example, a water-cooled four-cycle V-type engine as will be described later.

A fuel tank 118 is mounted above the engine of the engine unit 117, and the aforesaid seat 110 is continuously provided behind the fuel tank 118. In front of the handlebar 104, a meter unit 119 including a speedometer, a tachometer, various kinds of indicator lamps, or the like is mounted, and on a front side of the meter unit 119, a wind shield 120 is provided upright. Further, under the wind shield 120, a headlamp 121 is disposed.

In the vehicle exterior, mainly a front portion of the vehicle or the vicinity of left and right sides of the fuel tank 118 is covered by a front cowl or a tank side panel 122, and both left and right side portions of the vehicle are covered by a side cover 123. By these exterior members, a vehicle outer form having what is called a streamlined shape is formed.

Figure 2:
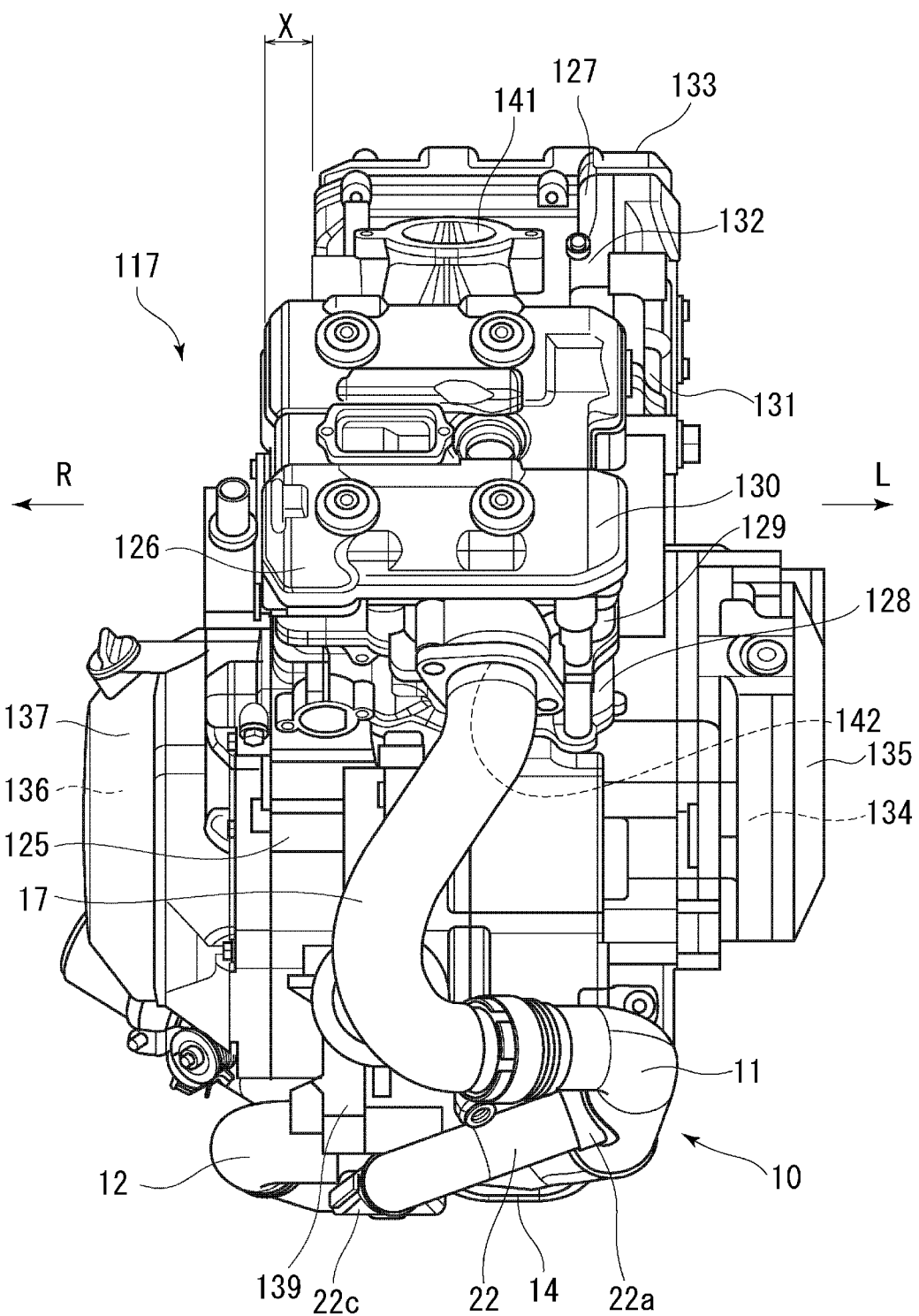
FIG. 2 is a front view of an engine unit according to the present invention.
Figure 3:
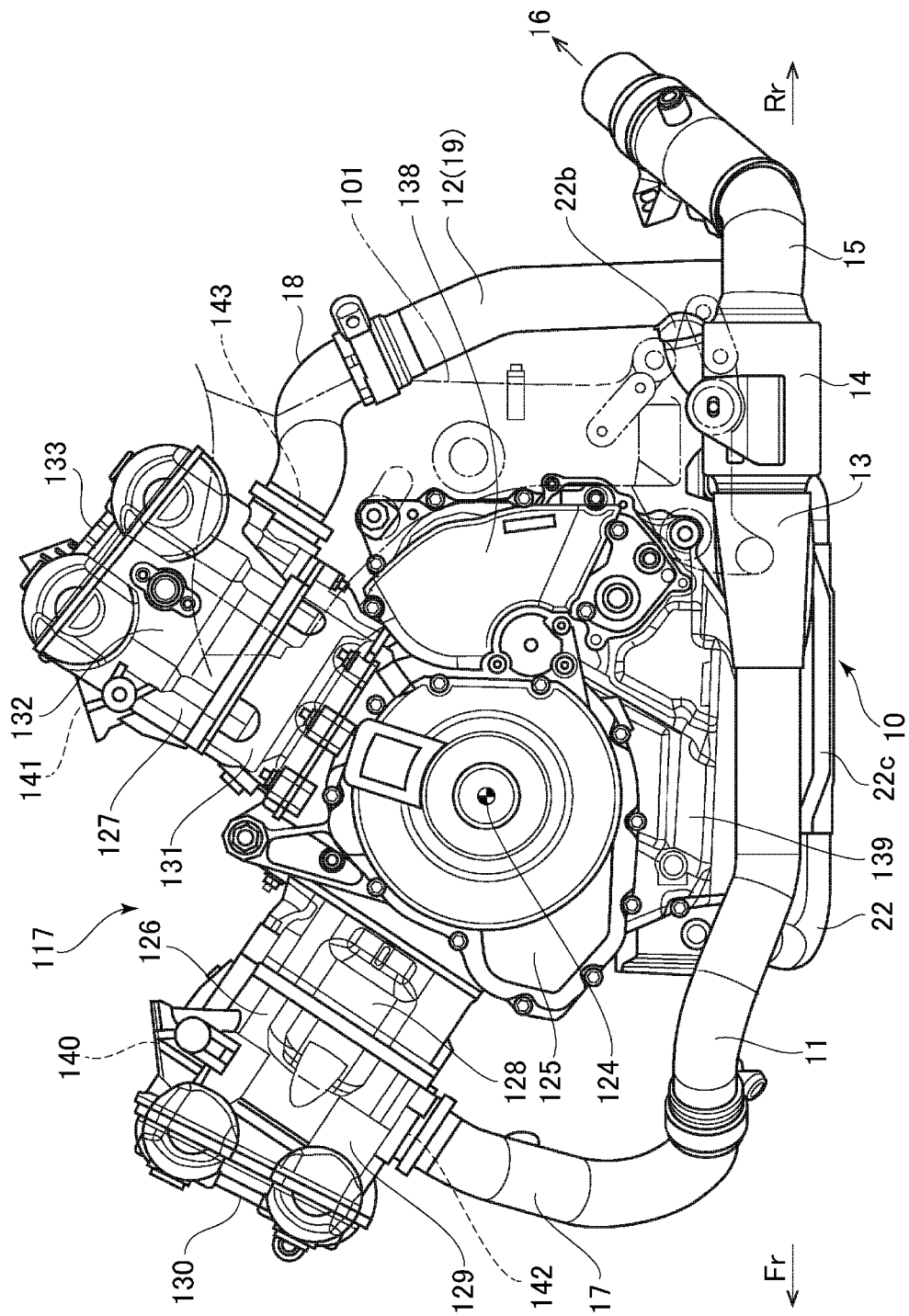
FIG. 3 is a left side view of the engine unit according to the present invention.
Figure 4:
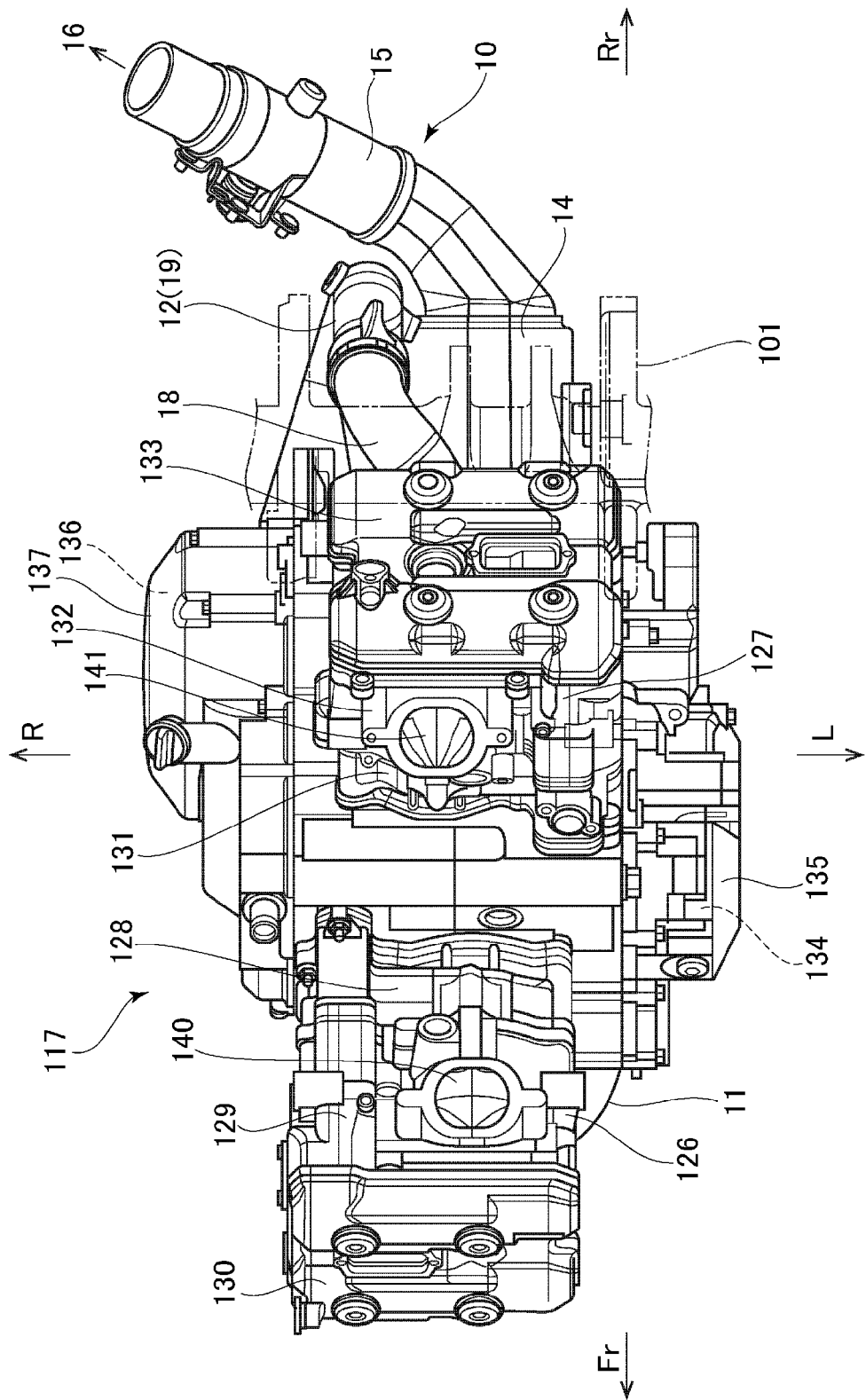
FIG. 4 is a top view of the engine unit according to the present invention.
Figure 5:
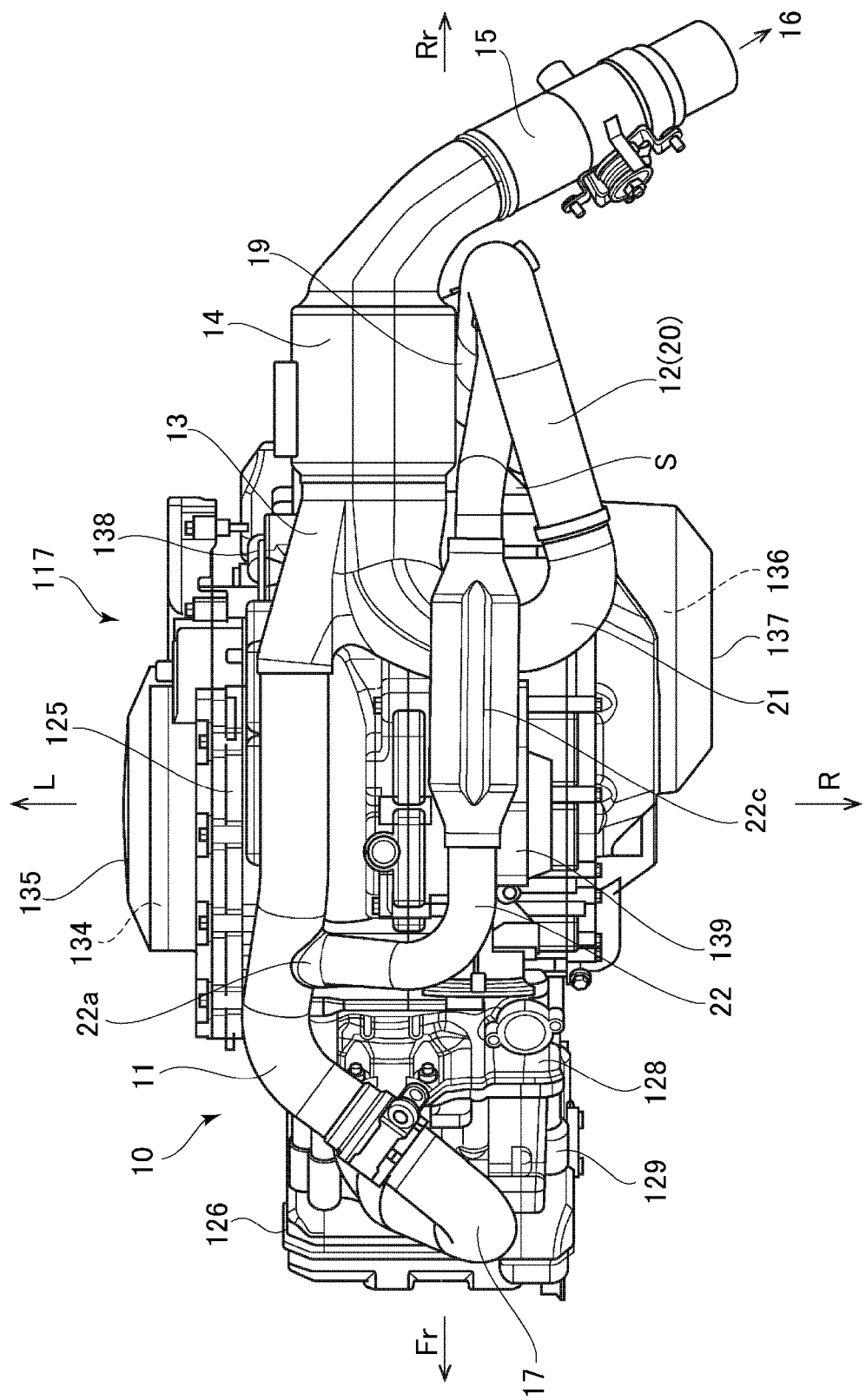
FIG. 5 is a bottom view of the engine unit according to the present invention.

Next, FIG. 2 to FIG. 5 illustrates the structure of an essential part of the engine unit 117. With reference to FIG. 2 to FIG. 5, a basic structure of the engine unit 117 will be described. FIG. 2 is a front view of the engine unit 117, FIG. 3 is a left side view of the same, FIG. 4 is a top view of the same, and FIG. 5 is a bottom view of the same. In this embodiment, the V-type twin engine in which a pair of cylinders is arranged in a V-shape along a vehicle front and rear direction is mounted as previously described. The engine has, in its base portion, a crankcase 125 housing a crankshaft 124 (roughly illustrated in FIG. 3) horizontally supported in a left and right direction, a front cylinder 126 being one of the cylinders is inclined forward to be coupled to an upper side of the crankcase 125, and a rear cylinder 127 being the other cylinder is inclined rearward to be coupled to the crankcase 125.

In the front cylinder 126, a cylinder 128, a cylinder head 129, and a cylinder head cover 130 are integrally coupled so as to be stacked in the order mentioned from the crankcase 125. Further, in the rear cylinder 127, a cylinder 131, a cylinder head 132, and a cylinder head cover 133 are integrally coupled so as to be stacked in the order mentioned from the crankcase 125. An angle made by front and rear banks of the front cylinder 126 and the rear cylinder 127 forming a V-bank (bank angle) is typically 90°, but the bank angle can be smaller than this. The front cylinder 126 and the rear cylinder 127 are off-set from each other in the vehicle left and right direction (in FIG. 2, X is their off-set length), and in this example, the front cylinder 126 and the rear cylinder 127 moderately deviate rightward and leftward respectively.

On a left axial end side of the crankshaft 124, a magneto chamber 134 covered by a magneto cover 135 is provided adjacently to the crankcase 125. Further, on a right axial end and a rear side of the crankshaft 124, a clutch chamber 136 covered by a clutch cover 137 is provided adjacently to the crankcase 125. On a rear portion of the crankcase 125, a transmission case 138 (FIG. 3) is integrally formed, and in this transmission case 138, a counter shaft and a plurality of transmission gears, which are not illustrated, are disposed. On a bottom portion of the crankcase 125, an oil pan 139 is attached. The crankcase 125 and the transmission case 138 are integrally coupled, and as a whole form a casing assembly of the engine unit 117. The V-type twin engine thus structured is suspended on the body frame 101 via the plural engine mounts to be thereby integrally coupled to and supported on an inner side of the body frame 101, and the engine itself operates as a rigid member of the body frame 101.

The motive power of the engine unit 117 is transmitted from the crankshaft 124 in the crankcase 125 through a transmission in the transmission case 138 finally to a drive sprocket being its output end. This drive sprocket drives and rotates the driven sprocket 115 via the chain 114 (FIG. 1) for motive power transmission, and accordingly rotates the rear wheel 113. Incidentally, the chain 114 and the driven sprocket 115 are disposed on a left side of the rear wheel 113.

The engine unit 117 further includes, though their detailed illustration is omitted, an intake system which supplies an air-fuel mixture made of the air (intake air) and a fuel supplied from an air cleaner and a fuel supply device respectively, an exhaust system which discharges exhaust gas after combustion from the engine, a cooling system which cools the engine, a lubricating system which lubricates movable parts of the engine, and a control system which controls their operations (ECU; Engine Control Unit). Under the control by the control system, a plurality of functional systems operate in cooperation with the aforesaid auxiliary machines and so on, so that the smooth operation as the whole engine unit 117 is executed.

In the above-described case, more concretely, in the intake system, an intake port 140 (refer to FIG. 4) is opened in a rear side of the cylinder head 129 of the front cylinder 126, and a throttle body is connected to this intake port 140 via an intake pipe. An intake port 141 (refer to FIG. 4 and so on) is opened in a front side of the cylinder head 132 of the rear cylinder 127, and a throttle body is connected to this intake port 141 via an intake pipe. In this example, the intake port 140 of the front cylinder 126 and the intake port 141 of the rear cylinder 127 are both provided in the V bank, and are supplied with the purified air from an air cleaner box of the air cleaner disposed at an upper center portion of the V bank, via the respective throttle bodies.

In each of the throttle bodies, a throttle valve (not illustrated) that opens/closes an intake flow path or passage formed inside the throttle body according to an opening degree of an accelerator is fit, so that a flow rate of the air fed from the air cleaner is controlled, though their detailed illustration is omitted. Incidentally, there is provided a valve driving mechanism that mechanically, electrically, or electromagnetically drives these throttle valves. In each of these throttle bodies, an injector for fuel injection is disposed on a downstream side of the throttle valve, and the fuel in the fuel tank 118 is supplied to these injectors by a fuel pump. In this case, the injectors each inject the fuel to the intake air flow path in the throttle body at a predetermined timing by being controlled by the aforesaid control system, so that the air-fuel mixture with a predetermined air-fuel ratio is supplied to the cylinder 128 and the cylinder 131 of the front cylinder 126 and the rear cylinder 127.

Next, the exhaust system has an exhaust device 10 that discharges combustion gas in the front cylinder 126 and the rear cylinder 127 from the engine. The exhaust device 10 will be described in detail later. Incidentally, in a front side of the cylinder head 129 of the front cylinder 126, an exhaust port 142 (its rough position is indicated by the dotted line in FIG. 2, FIG. 3, or the like) is opened, and a later-described exhaust pipe is connected to this exhaust port 142. Further, in a rear side of the cylinder head 132 of the rear cylinder 127, an exhaust port 143 (its rough position is indicated by the dotted line in FIG. 2, FIG. 3, or the like) is opened, and a later-described exhaust pipe is connected to this exhaust port 143.

Further, in the cooling system, in both the front cylinder 126 and the rear cylinder 127, around a cylinder block including their cylinder 128 and cylinder 131, a water jacket formed so that cooling water circulates therein is formed. A radiator (disposed at a front obliquely upward position of the front cylinder 126 and by using the body frame 101 and so on, is supported on their appropriate places, though not illustrated) which cools the cooling water fed to the water jacket is equipped.

Further, the lubricating system for supplying lubricating oil to the movable parts of the engine unit 117 to lubricate them is formed. This lubricating system includes: the crankshaft 124; valve driving devices formed in the cylinder heads 129, 132 of the front cylinder 126 and the rear cylinder 127; a cam chain coupling them; a transmission; and so on. In this embodiment, an ordinary oil pump is used for the lubricating system, and by this oil pump, the lubricating oil pumped up from the oil pan 139 is fed to the lubricating system.

Figure 6:
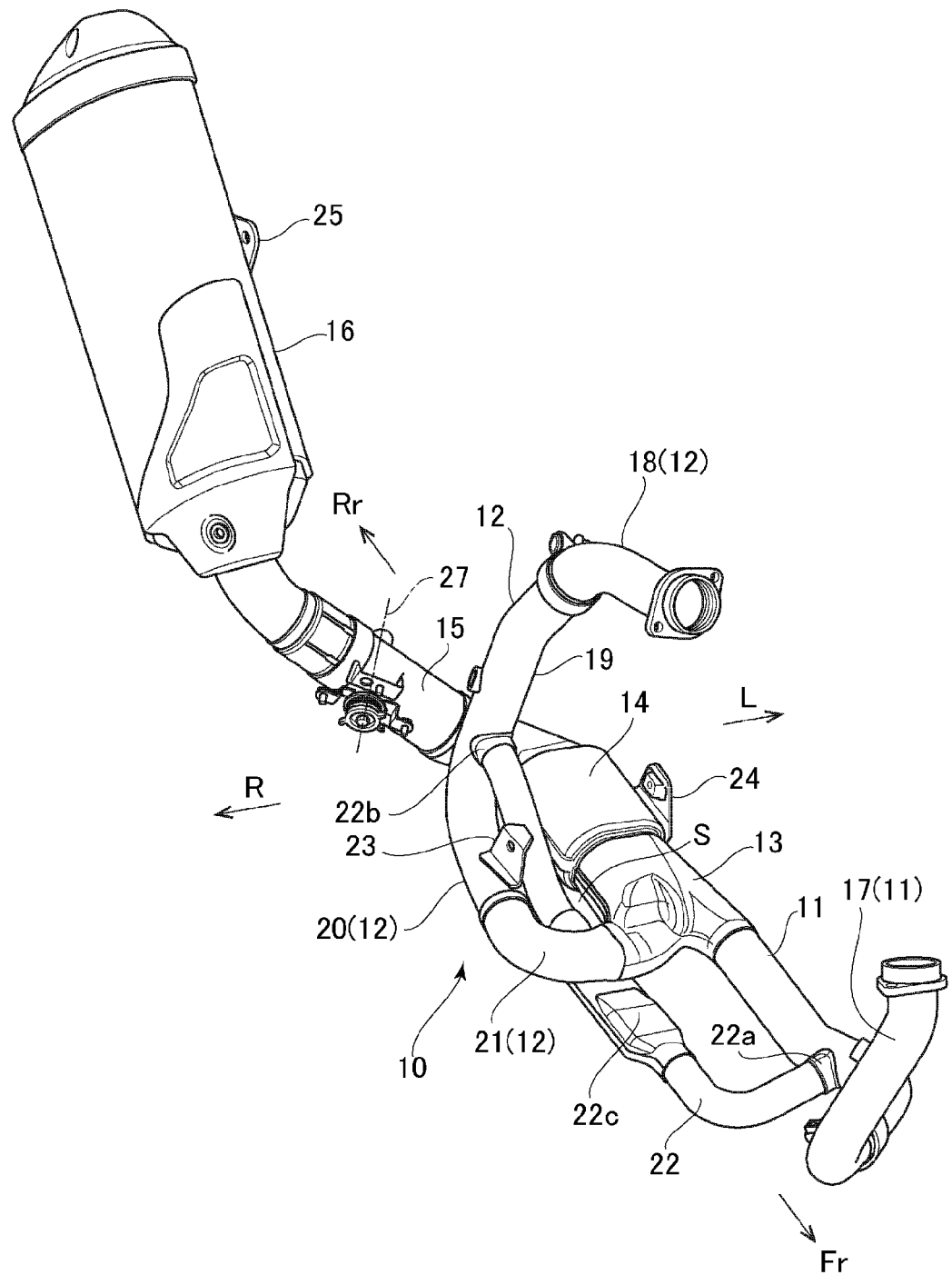
FIG. 6 is a right front perspective view in the embodiment of an exhaust device of the motorcycle of the present invention.
Figure 7:
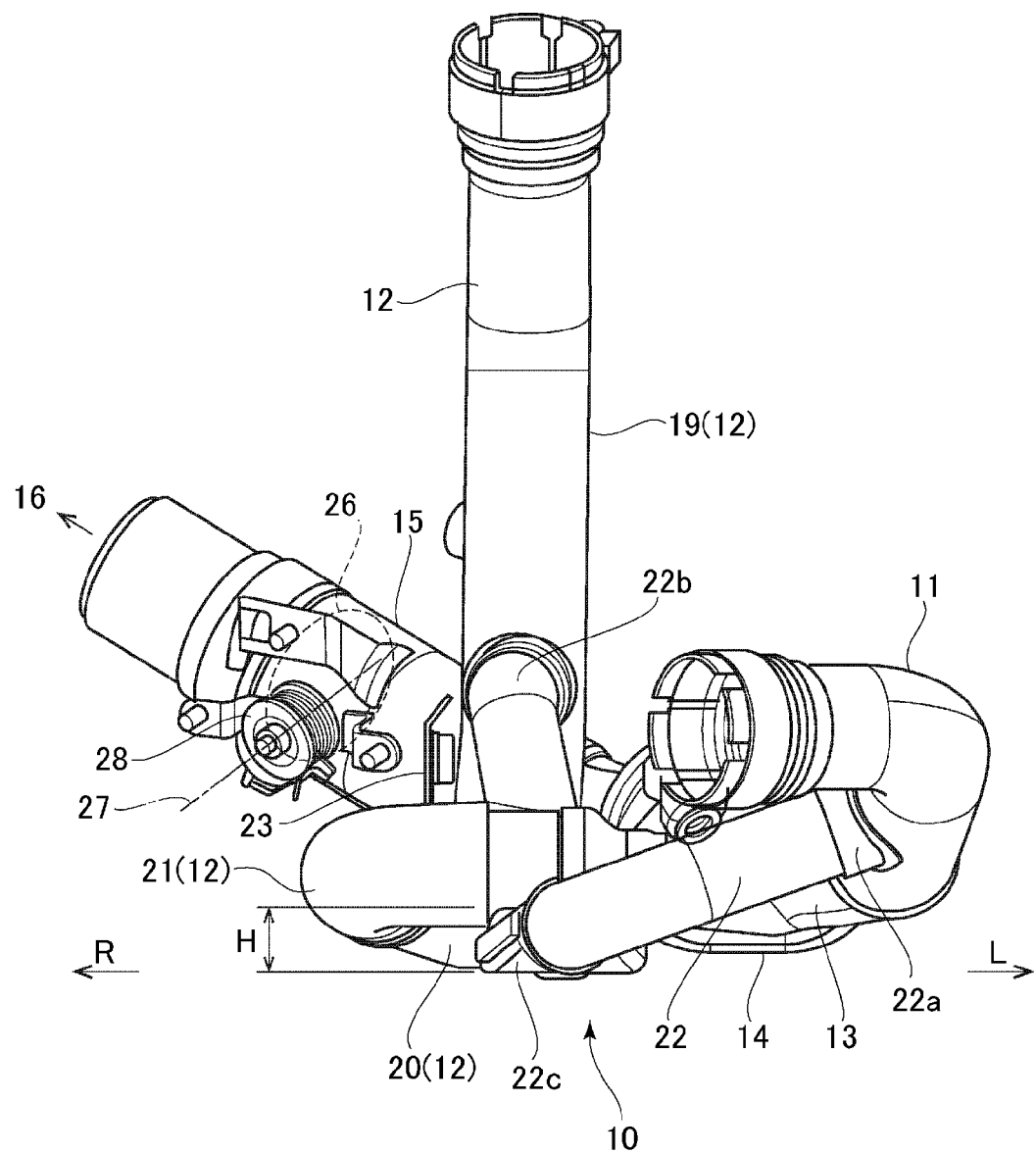
FIG. 7 is a front view in the embodiment of the exhaust device of the motorcycle of the present invention.
Figure 8:
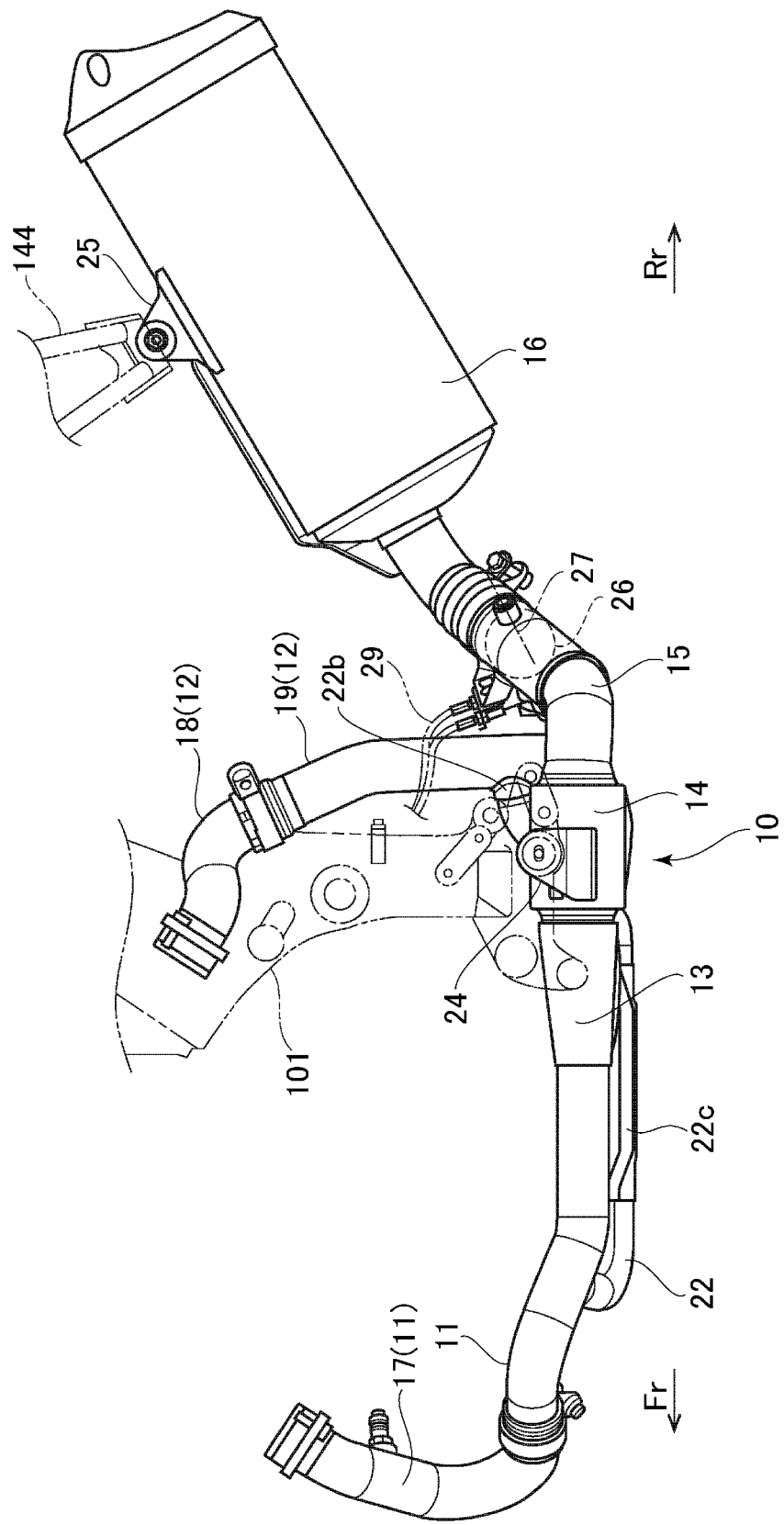
FIG. 8 is a left side view in the embodiment of the exhaust device of the motorcycle of the present invention.
Figure 9:
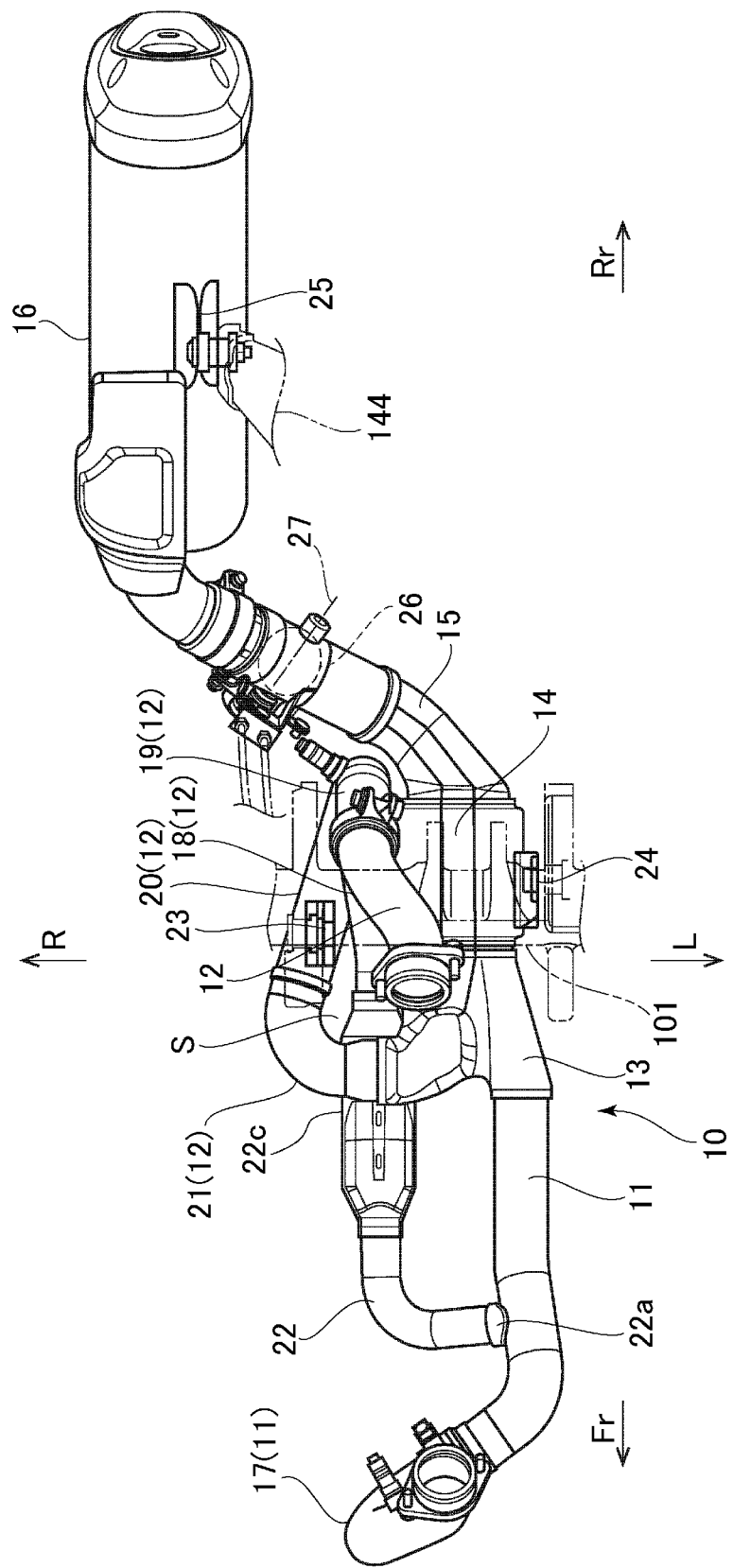
FIG. 9 is a top view in the embodiment of the exhaust device of the motorcycle of the present invention.

The engine unit 117 according to the present invention includes the exhaust device 10 which discharges the combustion gas generated in the front cylinder 126 and the rear cylinder 127 from the engine, and FIG. 6 illustrates a right front perspective view of the exhaust device 10. FIG. 7 to FIG. 9 illustrate a structure example of the exhaust device 10, and the exhaust device 10 will be described also with reference to FIG. 2 to FIG. 5 when necessary. Note that FIG. 7 is a front view of the exhaust device 10, FIG. 8 is a left side view of the same, and FIG. 9 is a top view of the same.

First, in the basic structure of the exhaust device 10, though its details will be described later, the exhaust pipe 11 is connected to the exhaust port 142 of the front cylinder 126, and this exhaust pipe 11 extends roughly rearward. The exhaust pipe 12 is connected to the exhaust port 143 of the rear cylinder 127, and this exhaust pipe 12 once extends roughly forward, and thereafter is folded back in the middle to extend rearward. The exhaust pipe 11 and the exhaust pipe 12 join each other at a collection part or a collection pipe 13, pass through a catalyst device 14 disposed immediately behind and on an exhaust downstream side of the collection part 13, and are connected to a muffler 16 via a single exhaust pipe 15.

More concretely, the exhaust pipe 11 has a connection part 17 connected to the exhaust port 142 of the front cylinder 126. In a front view, this connection part 17 extends right obliquely downward from the exhaust port 142 and its lower portion curves left rearward as illustrated in FIG. 2. Further, as illustrated in FIG. 5, the connection part 17 is coupled to the exhaust pipe 11 at its portion extending left rearward. That is, an upper end portion of the connection part 17 is attached and fixed to the exhaust port 142 from a front obliquely downward direction, and in its portion extending left rearward (in more detail, in its portion more on a vehicle left side than the exhaust port 142), its lower end portion is inserted and coupled to a fastening fixture of the exhaust pipe 11 from an axial direction. Incidentally, the connection part 17 extends in a substantially up and down direction in a side view as illustrated in FIG. 8. The exhaust pipe 11, after extending left rearward, bends to pass a position that is under and closer to the left side of the crankcase 125 so as to extend along the left side of the vehicle in the front and rear direction, extends rearward, and is connected to the collection part 13 to which the exhaust system of the rear cylinder 127 is connected. Incidentally, the collection part 13 has a substantially Y-shape in a top view in FIG. 9, with its front bifurcated parts joining on a rear side, and is disposed so as to be located substantially under the transmission case 138 (refer to FIG. 3). The exhaust pipe 11 is connected to one side (left side) of the bifurcated shape of the collection part 13. The catalyst device 14 disposed immediately behind the collection part 13 is disposed more on a vehicle center side than a portion of the exhaust pipe 11 which extends along the front and rear direction, and is disposed at a position that is substantially behind and under the transmission case 138 and is at the rear of the oil pan 139 in a side view as illustrated in FIG. 3. The single exhaust pipe 15 is connected to a rear portion of the catalyst device 14, and the exhaust pipe 15 extends while bending rear right upward, so as to pass a position that is at the rear of a lower portion of a later-described up-down passage part 19 and is between the up-down passage part 19 and the rear wheel 113, and is connected to the muffler 16 disposed on a right side of the rear wheel 113.

The exhaust pipe 12 has a connection part 18 connected to the exhaust port 143 of the rear cylinder 127. The connection part 18 extends right obliquely rearward from the exhaust port 143 to curve rear downward in a top view as illustrated in FIG. 4. The exhaust pipe 12 connected to the connection part 18 extends as the up-down passage part 19 in a substantially up and down direction as illustrated in FIG. 7 or FIG. 8. Then, an upper portion of the up-down passage part 19 of the exhaust pipe 12 slightly bends toward the vehicle front side, has a fastening fixture at its upper end portion, and is coupled to the connection part 18, with a rear end portion, of the connection part 18, which curves and extends rear downward, being inserted thereto from the axial direction. A lower portion of the up-down passage part 19 curves forward immediately on a right side of the vicinity of the rear end portion of the catalyst device 14, but thereafter extends more forward than the catalyst device 14 while inclining rightward in a top view (FIG. 9) as the front-rear passage part 20, that is, while separating from the catalyst device 14. The exhaust pipe 12 further bends or curves leftward as a front end bending part 21 with a relatively large radius of curvature from a front end portion, of the front-rear passage part 20, which is near a position corresponding to the collection part 13 in the front and rear direction, and is connected to the other side (right side) of the bifurcated shape of the collection part 13. The exhaust pipe 12 thus has the up-down passage part 19, the front-rear passage part 20, and the front end bending part 21 in order from the exhaust upstream side to downstream side.

To summarize the layout of the exhaust pipe 12, its up-down passage part 19 practically connects the exhaust port 143 of the rear cylinder 127 and the front-rear passage part 20, and the front-rear passage part 20 is disposed in an inclined manner so as to be more apart rightward from the catalyst device 14 as it goes toward the vehicle front side in a plane view. The front end portion of the front-rear passage part 20 is connected to the collection part 13 with a large curvature (R) via the front end bending part 21, that is, a space S widening forward in a plane view is formed between the front-rear passage part 20 and the catalyst device 14 as illustrated in FIG. 9 and so on. Incidentally, the shape of this space S is, for example, a substantially wedge shape with its rear side tapering off, or a shape such as a slender isosceles triangular shape. Further, in a side view as illustrated in FIG. 3, the up-down passage part 19 is disposed at the rear of the body frame 101 so as to be located at a position not overlapping with the rear end portion (portion extending in the up and down direction) of the body frame 101, so that there occurs no trouble in supporting the swing arm 111.

The present invention especially has the connecting pipe 22 via which the exhaust pipe 11 of the front cylinder 126 and the exhaust pipe 12 of the rear cylinder 127 communicate with each other, and this connecting pipe 22 passes through the space S between the exhaust pipe 12 (concretely, the front-rear passage part 20) of the rear cylinder 127 and the catalyst device 14 as illustrated in FIG. 9 (also refer to FIG. 5).

In this case, one end 22a of the connecting pipe 22 is connected to an appropriate middle place of the exhaust pipe 11 of the front cylinder 126 which place is on the exhaust upstream side of the collection part 13, to communicate with the exhaust pipe 11. In more detail, the one end 22a is connected from the vehicle center side to the portion, of the exhaust pipe 11, which is along the front and rear direction and is more forward than the oil pan 139. Further, another end 22b of the connecting pipe 22 is connected to the exhaust pipe 12 of the rear cylinder 127 on the exhaust upstream side of the collection part 13, that is, to an appropriate middle place of the up-down passage part 19 to communicate with the exhaust pipe 12 (refer to FIG. 6 and so on). In more detail, the other end 22b is connected to the lower portion of the up-down passage part 19 from the vehicle front side. The connecting pipe 22 extends rightward from the exhaust pipe 11 to which its one end 22a is connected, so as to make a substantially T-shape with the exhaust pipe 11 as illustrated in FIG. 9, and thereafter curves rearward to extend substantially linearly in the front and rear direction, and after passing under the front end bending part 21, bends rear upward to be connected to the lower portion of the up-down passage part 19 from the vehicle front side.

The space S is surrounded also by the front end bending part 21, and the connecting pipe 22 passes through the space S surrounded by the catalyst device 14, the front-rear passage part 20, and the front end bending part 21 from top to bottom. In this case, the connecting pipe 22 has an underpass part 22c which extends from a front side of the lower portion of the up-down passage part 19 front downward, and passes under the front end bending part 21 to extend forward, and this underpass part 22c is formed flat in the up and down direction. Note that in FIG. 7, H is the height or thickness of the underpass part 22c. Incidentally, around the underpass part 22c, the inside is appropriately reinforced, thereby taking a vibration countermeasure against resonance or the like. Alternatively, the front end bending part 21 or the collection part 13 disposed above the underpass part 22c may be formed flat in the up and down direction and the underpass part 22c may be disposed higher.

Further, as previously described, the front cylinder 126 and the rear cylinder 127 are off-set from each other in the vehicle left and right direction, the front cylinder 126 deviating moderately rightward and the rear cylinder 127 deviating moderately leftward. Regarding this, as illustrated in FIG. 9, the catalyst device 14 deviates toward the same side (leftward) as the rear cylinder 127 in the vehicle left and right direction, and the front-rear passage part 20 deviates toward the same side (rightward) as the front cylinder 126 in the vehicle left and right direction. That is, the connection part 17 and the exhaust pipe 11 which are related to the front cylinder 126 off-set rightward from the rear cylinder 127 bend and extend left rearward, and the exhaust pipe 11 is disposed on the left side of the vehicle. The connection part 18, the up-down passage part 19, and the front-rear passage part 20 related to the rear cylinder 127 off-set leftward from the front cylinder 126 bend and extend right rearward and are disposed on the right side of the vehicle.

In the above-described case, the exhaust device 10 is integrally coupled as a whole as illustrated in FIG. 6, and as illustrated also in FIG. 8, FIG. 9, or the like, attachment brackets 23, 24, 25 formed to project upward are attached to the exhaust pipe 12 (front-rear passage part 20), the catalyst device 14, and the muffler 16 respectively. The brackets 23, 24 of the exhaust pipe 12 and the catalyst device 14 are connected to appropriate places near the lower end portion of the body frame 101. The bracket 25 of the muffler 16 is connected to an appropriate place of a stay 144 (refer to FIG. 1 and FIG. 8) which is supported by using, for example, the seat rail 109 or the like. Thus, the exhaust device 10 is connected to and supported on the body frame 101 side at a plurality of points, so that high support rigidity is ensured.

In the present invention, an exhaust throttle valve 26 is further provided at an appropriate middle place of the exhaust pipe 15 on the exhaust upstream side of the muffler 16 as briefly illustrated in FIG. 8 or FIG. 9. This exhaust throttle valve 26 is supported inside the exhaust pipe 15 so as to be rotatable around a rotation support shaft 27, is driven to rotate by an on-vehicle actuator unit, though its detailed illustration is omitted, to control an exhaust stream in the exhaust pipe 15. As a concrete structure of the actuator unit, adoptable is, for example, one in which pulleys 28 (FIG. 7) provided in its driving part and the rotation support shaft 27 of the exhaust throttle valve 26 respectively are coupled via a driving force transmitting means 29 (refer to FIG. 8 or FIG. 9) such as a wire cable and the operation of a drive motor or the like of the driving part is controlled by ECU. By rotating the pulleys 28, the exhaust throttle valve 26 is opened/closed to a desired opening degree.

As the operation of the exhaust throttle valve 26, its opening degree is controlled according to an engine rotation speed, thereby making it possible to achieve the suppression of exhaust pulsation, and so on. For example, when the engine rotation speed is low, the exhaust throttle valve 26 is set to a low opening degree, so that the exhaust pulsation when the engine rotation speed is low is optimized, resulting in improved output at the time of the low speed. Further, when the engine rotation speed is high, the exhaust throttle valve 26 is substantially fully opened.

Next, main operations and so on in the exhaust device 10 of the present invention will be described. First, in the V-type twin engine of this type, in the exhaust system, the catalyst device 14 is mounted and the connecting pipe 22 via which the exhaust pipe 11 of the front cylinder 126 and the exhaust pipe 12 of the rear cylinder 127 communicate with each other is provided.

Especially the connecting pipe 22 is laid out so as to pass through the space S between the exhaust pipe 12 of the rear cylinder 126 and the catalyst device 14, which realizes the very compact layout of the exhaust pipe without the connecting pipe 22 protruding sideways from the vehicle. Incidentally, by providing the connecting pipe 22 via which the exhaust pipe 11 and the exhaust pipe 12 communicate with each other, the operation to cancel the mutual influence of the exhaust pulsations of the front and rear cylinders is produced, which can realize an improvement in an output characteristic of the engine.

Further, the space S in which the connecting pipe 22 is disposed is formed by the front-rear passage part 20 of the exhaust pipe 12 of the rear cylinder 127, and by effectively using the space on the inner side of the front-rear passage part 20, it is possible to dispose the connecting pipe 22.

In this case, the up-down passage part 19 of the exhaust pipe 12 communicates with the other end 22b of the connecting pipe 22, and from this other end 22b, the connecting pipe 22 passes through the space S forward from top to bottom. The space S is surrounded also by the front end bending part 21, and in this respect as well, the connecting pipe 22 is disposed by effectively using the space on the inner (rear) side of the front end bending part 21.

Further, the front-rear passage part 20 of the exhaust pipe 12 is disposed in an inclined manner so as to be more apart from the catalyst device 14 as it goes more toward the vehicle front side.

The space S formed between the front-rear passage part 20 and the catalyst device 14 (or the collection part 13) can be reserved so as to fan out forward, so that the space where to dispose the connecting pipe 22 can be reserved with ease and with a large size. In this case, the exhaust pipe 12 is connected to the collection part 13 via the front end bending part 21 with a large curvature, which can reduce flow resistance of the exhaust stream in the exhaust pipe 12 to realize an improvement in exhaust efficiency.

Further, the connecting pipe 22 has the underpass part 22c passing under the front end bending part 21 to extend forward, and this underpass part 22c is formed flat in the up and down direction.

The front end bending part 21 and the underpass part 22c are stacked in two tiers, but the front end bending part 21 of the exhaust pipe 12 is disposed as close to a lower surface side of the crankcase 125 as possible, and at the same time, the connecting pipe 22 is disposed under the front end bending part 21 so as not to project toward the crankcase 125. In this case, by forming the underpass part 22c flat in the up and down direction, it is possible to suppress its downward projection while ensuring its passage sectional area, make the height position of the connecting pipe 22 practically high, and set the minimum road clearance of the vehicle large.

Further, the catalyst device 14 deviates toward the rear cylinder 127 in the vehicle left and right direction, and the front-rear passage part 20 deviates toward the front cylinder 126 in the vehicle left and right direction.

Disposing the catalyst device 14 and the front-rear passage part 20 according to the off-set disposition of the front cylinder 126 and the rear cylinder 127 ensures a degree of freedom of the exhaust pipe 11 and the exhaust pipe 12 especially in the vehicle left and right direction, and has advantages such as facilitating the design of their connection parts, their connection work when they are mounted on the vehicle, and so on.

Further, in the above-described case, on the exhaust upstream side of the collection part 13, the front cylinder 126 and the rear cylinder 127 are coupled via the connecting pipe 22 at practically equal distance positions (the one end 22a and the other end 22b) from the exhaust port 142 and the exhaust port 143, which suppresses the occurrence of a torque valley to contribute to an improvement of torque characteristics.

As described hitherto, according to the exhaust device 10 of the present invention, the connecting pipe 22 connecting the front cylinder 126 and the rear cylinder 127 is laid out so as not to appear to the outer appearance in the V-type twin engine of this type, which improves marketability of the vehicle. Further, the exhaust pipe 11 is coupled to the exhaust pipe 12 at an ideal position, which can realize the optimum torque characteristics and in addition, can minimize an influence of the emission standards on the torque characteristics, making it possible to effectively maintain and improve marketability, motive power characteristics, and so on.

Hitherto, the present invention has been described together with various embodiments, but the present invention is not limited only to these embodiments, and changes and so on can be made within the range of the present invention.

Regarding the arrangement of the front cylinder 126, the rear cylinder 127, the exhaust pipe 11, and the exhaust pipe 12, their positional relation in particular in the vehicle left and right direction may be reversed from that in the above-described embodiment.

Further, the example of the V-type twin engine with one front cylinder and one rear cylinder is described, but the present invention is effectively applicable also to a multi-cylinder engine in which the front and rear cylinders each have two cylinders or more. For example, in a V-type four-cylinder engine having two cylinders per each of the front and rear banks, exhaust pipes of the two cylinders of the front bank are joined via an exhaust manifold into a single front exhaust pipe, and exhaust pipes of the two cylinders of the rear bank are joined via an exhaust manifold into a single rear exhaust pipe. The present invention is also applicable to the front exhaust pipe and the rear exhaust pipe thus structured.

According to the present invention, the connecting pipe is laid out so as to pass through the space between the exhaust pipe of the rear cylinder and the catalyst device, thereby realizing the very compact exhaust pipe layout without the connecting pipe protruding sideways from the vehicle.

In this case, it is possible to realize an improvement in torque characteristics and so on while realizing a short distance so as to be advantageous for coping with the standards regarding the distance layout from the exhaust port outlet to a catalyst which is necessary for clearing the emission standards.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An exhaust device of a motorcycle equipped with a V-type engine in which front and rear cylinders are arranged in a V-shape along a vehicle front and rear direction, the exhaust device comprising:
   a catalyst device disposed on an exhaust downstream side of a collection pipe of an exhaust pipe of the front cylinder and an exhaust pipe of the rear cylinder; and a connecting pipe via which the exhaust pipe of the front cylinder and the exhaust pipe of the rear cylinder communicate with each other, wherein the connecting pipe communicates with the exhaust pipe of the front cylinder upstream of the collection pipe, and wherein the connecting pipe passes through a space between the exhaust pipe of the rear cylinder and the catalyst device.

2. The exhaust device of the motorcycle according to claim 1, wherein the exhaust pipe of the rear cylinder has: a front-rear passage part once extending toward a vehicle front side; and a front end bending part bending at a front end portion of the front-rear passage part to communicate with the catalyst device, and wherein the connecting pipe passes through a space between the front-rear passage part and the catalyst device.

3. The exhaust device of the motorcycle according to claim 2, wherein the exhaust pipe of the rear cylinder has an up-down passage part connecting the front-rear passage part and an exhaust port of the rear cylinder, and wherein the connecting pipe communicates with the up-down passage part and passes through a space surrounded by the front-rear passage part, the catalyst device, and the front end bending part from top to bottom.

4. The exhaust device of the motorcycle according to claim 2, wherein the front-rear passage part is disposed in an inclined manner so as to be more apart from the catalyst device as the front-rear passage part goes more toward the vehicle front side.

5. The exhaust device of the motorcycle according to claim 3, wherein the connecting pipe has an underpass part passing under the front end bending part when the connecting pipe passes through a space from top to bottom, to extend forward, and wherein the underpass part is formed flat in terms of an up and down direction.

6. The exhaust device of the motorcycle according to claim 2, wherein the front cylinder and the rear cylinder are off-set from each other in a vehicle left and right direction, and wherein the catalyst device deviates toward the rear cylinder in terms of the vehicle left and right direction, and the front-rear passage part deviates toward the front cylinder in terms of the vehicle left and right direction.

* * * * *